United States Patent [19]
Kociba et al.

[11] Patent Number: 6,019,383
[45] Date of Patent: Feb. 1, 2000

[54] SUSPENSION LINK ASSEMBLY

[75] Inventors: Scott M. Kociba; Jeffrey L. Kincaid, both of Clarkston, Mich.

[73] Assignee: American Axle & Manufacturing, Inc., Detroit, Mich.

[21] Appl. No.: 09/015,491

[22] Filed: Jan. 28, 1998

[51] Int. Cl.$^7$ ................................ B60G 3/02; B60G 3/26
[52] U.S. Cl. .............................. 280/124.134; 280/86.756; 280/86.757; 280/124.133
[58] Field of Search .................... 280/86.756, 86.757, 280/124.133, 124.134, FOR 107, 124.128, 124.132, 124.135, 124.136, FOR 124, FOR 125; 29/897.2; 74/588

[56] References Cited

U.S. PATENT DOCUMENTS

| | | | |
|---|---|---|---|
| 2,049,502 | 8/1936 | Hufferd et al. | 403/138 |
| 3,547,460 | 12/1970 | Gottschald et al. | 280/93.511 |
| 3,887,211 | 6/1975 | Mazur | 280/86.758 |
| 3,938,822 | 2/1976 | Guerriero | 280/86.756 |
| 4,601,602 | 7/1986 | Schnitzler | 403/56 |
| 5,094,474 | 3/1992 | Ando et al. | 280/691 |
| 5,236,209 | 8/1993 | Lopiccolo | 280/96.1 |
| 5,310,211 | 5/1994 | DelBeke | 280/673 |
| 5,503,418 | 4/1996 | Schmidt, Jr. et al. | 280/93.511 |
| 5,556,119 | 9/1996 | Buchner et al. | 280/96.1 |
| 5,597,175 | 1/1997 | Tuan | 280/124.111 |
| 5,603,583 | 2/1997 | Jackson | 403/320 |
| 5,868,410 | 2/1999 | Kawabe et al. | 280/124.15 |

*Primary Examiner*—J. J. Swann
*Assistant Examiner*—Christopher Bottorff
*Attorney, Agent, or Firm*—Harness, Dickey & Pierce, P.L.C.

[57] ABSTRACT

The present invention provides a suspension link assembly for use in interconnecting a suspension member to frame structure in a motor vehicle, and which finds particular application in rear independent suspension systems. The suspension link assembly includes an elongated extension rail and a tie rod assembly. The extension rail is a stamped component defining a generally U-shaped cross-section. The extension rail has a first end adapted to be pivotably connected to the frame structure and a second end defining an open-ended socket. The tie rod assembly includes a housing defining an annular cavity and a shank, and ball joint retained in the housing cavity and adapted for pivotable connection to the suspension member. The shank of the tie rod housing is slidably inserted into the socket of the extension rail. Once the desired length of the suspension link assembly is determined, the shank is rigidly secured in the socket, such as by a welding operation.

9 Claims, 3 Drawing Sheets

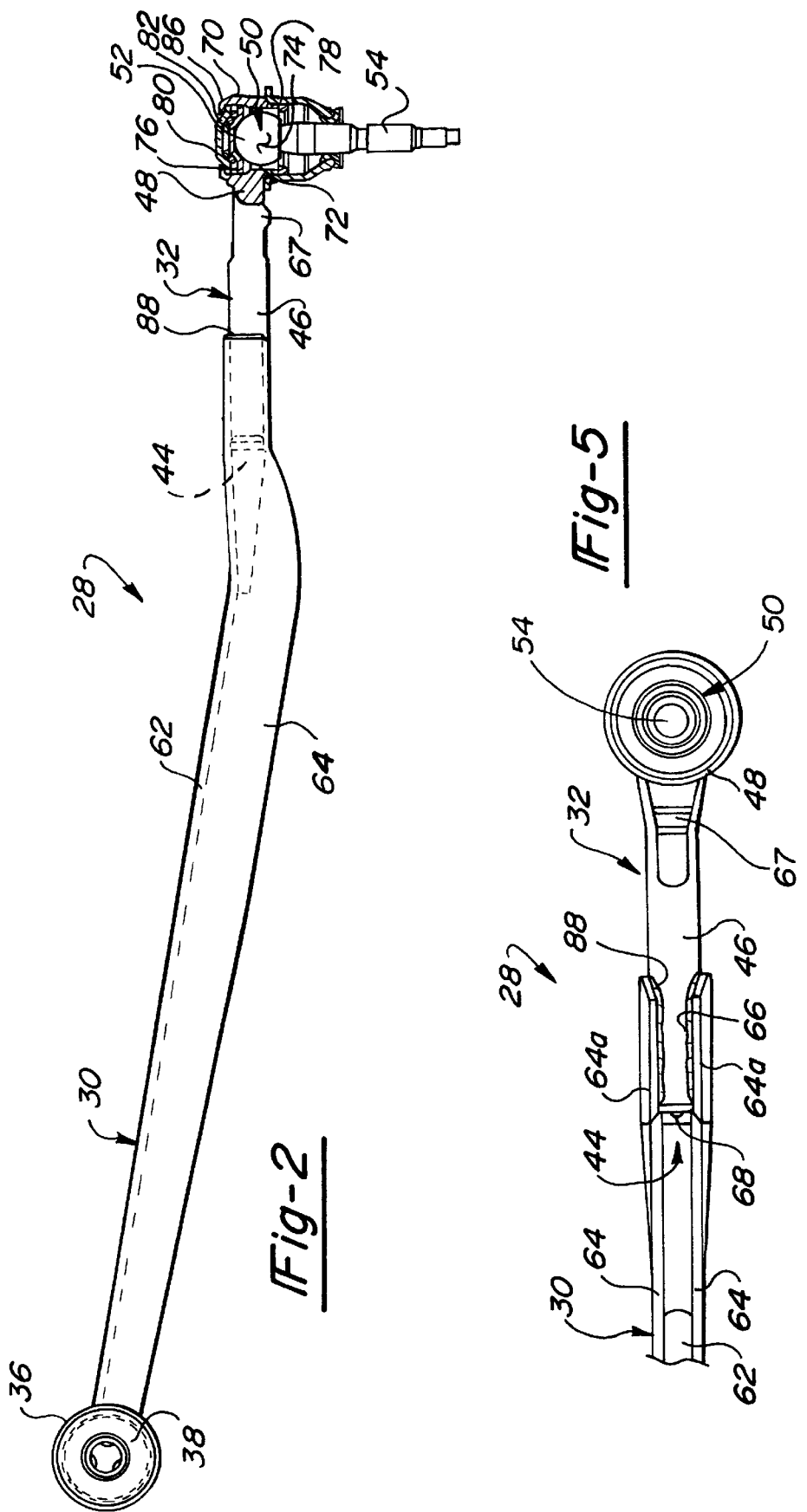

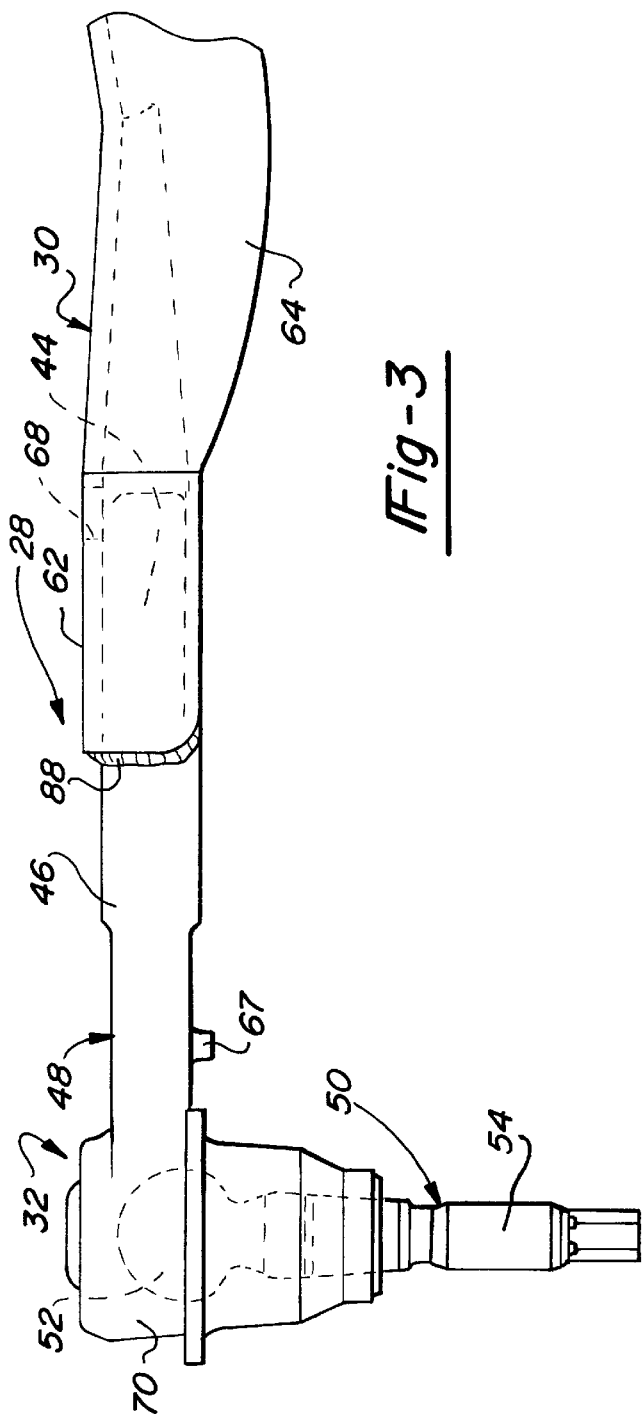
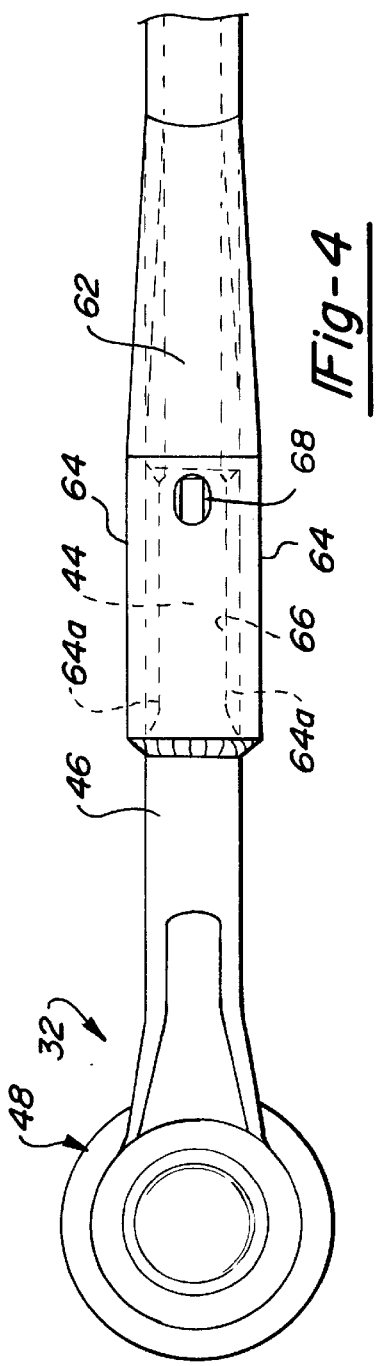

SUSPENSION LINK ASSEMBLY

BACKGROUND OF THE INVENTION

1. Technical Field

This invention generally relates to suspension systems for motor vehicles and, more particularly, to a suspension link assembly for independent suspensions of a motor vehicle.

2. Discussion

Suspension link assemblies of the type used in association with the rear independent suspension of motor vehicles typically include an elongated bar or rod which is adapted to pivotably interconnect a suspension member, such as a control arm, to the vehicle frame. In particular, a fastener extends through a rubber grommet mounted in an eye formed at one end of the rod to secure the rod for pivotal movement relative to the frame. Additionally, a ball joint provided at the opposite end of the rod is used to secure the rod to the control arm and accommodate angular movement therebetween.

In an effort to deproliferate the number of suspension link assemblies required for use in different vehicular suspensions, it is known to provide a modular assembly consisting of an extension rod and a tie rod assembly. Typically, the extension rod is a solid forged component having a first end that is adapted to be pivotably secured to the vehicle frame while its second end supports one end of the tie rod assembly. The opposite end of the tie rod assembly supports a ball joint that is adapted to be secured to the control arm. In many instances, the tie rod assembly includes a housing having a threaded shank that is screwed into a threaded aperture formed in the second end of the extension rod. Thus, suspension link assemblies of various lengths can be assembled by adjusting the amount of threaded connection between the tie rod housing and the extension rod. However, such "threaded" type connection only provided for incremental length adjustments since the angular relationship between the ball joint and the extension rod must be maintained. While such suspension link assemblies have proven suitable to perform their intended purpose, a need exists to continue the development of alternative assemblies and methods for adjustably connecting the extension rod to the tie rod assembly.

SUMMARY OF THE INVENTION

The above and other objects are provided by a suspension link assembly having the non-threaded shank segment of a tie rod housing retained and secured in an open-end socket formed in the end of an extension rail. The tie rod housing also includes an annular ball seat for receiving the ball stud of a ball joint therein.

According to another object of the present invention, the extension rail is a stamped component having a predetermined length and shape created during the stamping process. The extension rail is fabricated to include an open-ended channel-type socket which is sized to slidably receive the shank segment of the tie rod housing prior to welding of the shank segment to the extension rail.

BRIEF DESCRIPTION OF THE DRAWINGS

In order to appreciate the manner in which the advantages and objects of the invention are obtained, a more detailed description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 2 is a side view in partial cross section illustrating the suspension link assembly of FIG. 1 in greater detail;

FIG. 3 is an enlarged partial view of FIG. 2;

FIG. 4 is a top view of FIG. 3; and

FIG. 5 is a partial bottom view of the suspension link assembly of FIG. 3;

DETAILED DESCRIPTION OF THE PREFERRED EMBODIMENTS

Figure 1:
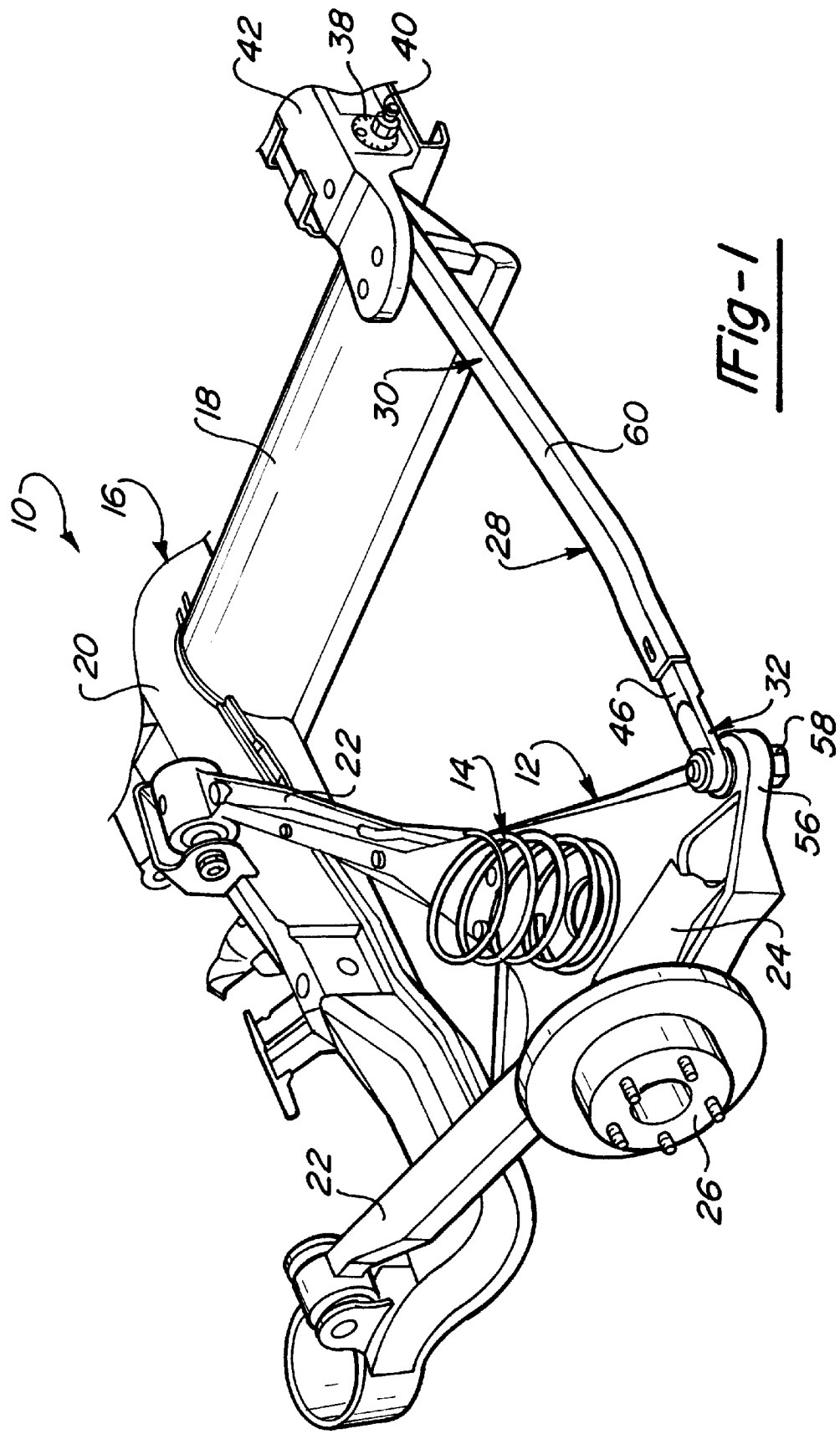
FIG. 1 is a perspective view of an exemplary vehicular rear independent suspension with the suspension link assembly of the present invention incorporated therein.

In general, the present invention is directed toward providing a suspension link assembly including a tie rod assembly having a housing secured (i.e., welded) directly to an extension rail. The extension rail is preferably manufactured as a stamped component. Furthermore, directly welding the tie rod housing to the extension rail provides a stronger interconnection than conventional suspension link assemblies. The suspension link assembly of the present invention finds particular applications in the rear independent suspension of a motor vehicle.

Turning now to the drawings, FIG. 1 shows a portion of an exemplary rear wheel independent suspension system, generally indicated at 10, of the type having a control arm 12 and a spring assembly 14 at each wheel which are suspended from the vehicle's subframe assembly 16. Reference will be made to subframe assembly 16 in the present disclosure which connects with regions of the vehicle body that act as an integrated frame structure. However, those skilled in the art will recognize that many current vehicles do not have an integrated vehicle subframe, but instead have a conventional frame with side rails and cross beams. With this in mind, subframe assembly 16 is partially shown to include a longitudinal frame member 18 and a transverse frame member 20.

As is conventional, arm segments 22 of control arm 12 are pivotally attached to transverse frame member 20 of subframe assembly 16 while spring assembly 14 is provided for damping relative movement between suspension 10 and subframe assembly 16. Spring assembly 14 includes helical coil spring which is retained between an intermediate portion of control arm 12 and the vehicle body for supporting the weight of the vehicle body and any loads which are transmitted through control arm 12. While not shown, a damper, such as a shock absorber, would also be interconnected between control arm 12 and the vehicle body in a conventional manner. As is also conventional, a knuckle (not shown) is connected to a lateral mounting flange 24 of control arm 12. A hub and rotor assembly 26 is attached to a spindle portion of the knuckle such that a wheel and tire may be mounted thereon. In addition, a suspension toe link, hereinafter referred to as suspension link assembly 28, is shown pivotably connecting control arm 12 to longitudinal frame member 18 of subframe assembly 16. Specifically, suspension link assembly 28 includes an elongated extension rail 30 which is interconnected to a tie rod assembly 32. A cylindrical eye form 36 is fixed (i.e., welded) to one end of extension rail 30 and has a rubber grommet 38 mounted therein. A fastener 40 extends through a sleeve in grommet 38 for pivotally securing extension rail 30 to a mounting bracket 42 fixed to frame member 18. The opposite end of extension rail 30 defines a socket 44 within which a shank segment 46 of a tie rod housing 48 is retained. A ball joint 50 is supported from tie rod housing 48 to cumulatively define tie rod assembly 32. Ball joint 50 includes a ball stud 52 having a threaded post 54 which passes through an aperture formed in a boss segment 56 of control arm 12 and is secured thereto via lock nut 58, thereby securing tie rod assembly 32 to control arm 12.

Referring now to FIGS. 2 through 5, suspension link assembly 28 will be described in greater detail. In particular, extension rail 30 is an elongated stamped metal component having eye form 36 fixed at one end and socket 44 formed at the opposite end. Rail 30 is generally U-shaped in cross-section and has an upper wall 62 connected to a pair of lateral side walls 64. As seen, the shape of rail 30 is slightly scalloped to accommodate the particular suspension application associated with the specific suspension link assembly 28 shown.

As best seen from FIG. 5, socket 44 is primarily formed by flanged end segments 64A of side walls 64 which define an open-ended channel-type aperture 66 therebetween. Preferably, end segments 64A converge such that aperture 66 has a width dimension that is complementary to the width dimension of shank segment 46 such that shank segment 46 can only slide, but not rotate, within socket 44. As such, the inner surfaces of upper wall 62 and end segments 64A define socket 44 which is adapted to slidably receive shank segment 46 of the rod housing 48 therein. In addition, a bore 68 is formed through upper wall 62 which communicates with socket 44 to provide visual assistance during assembly.

Once the desired overall length of suspension link assembly 28 is set during the assembly process by sliding shank segment 46 into socket 44, a weld joint is formed along exposed co-joint edge surfaces between shank segment 46 and socket 44. The weld joint resists the transfer of excessive axial and torsional loads between tie rod housing 48 and extension rail 30. A locator post 67 is provided on shank segment 46 of tie rod housing 48 for precisely setting the overall length of suspension link assembly 28. The tolerance between locator post 67 and the center line of ball stud 52 is closely controlled during manufacturing such that the overall length of suspension link assembly 28 can be controlled relative to locator post 67, particularly during the welding process. Referring primarily now to FIGS. 2 and 3, tie rod assembly 32 is shown to be assembled from a set of components including tie rod housing 48 and ball joint 50. In addition to shank segment 46, tie rod housing 48 includes an annular bellshaped segment 70 which defines an internal socket cavity 72. A ball segment 74 of ball stud 52 is retained in cavity 72 between a spring seat 76 and a ball seat 78. Spring seat 76 is shown inserted into cavity 72 with a spring 80 positioned between an end face of a socket plug 82 and an end face of spring seat 76. Prior to assembly of ball stud 50 into cavity 72 of tie rod housing 48, its post segment 54 is passed through a bore formed through ball seat 78 such that a portion of the spherical external surface of ball segment 74 engages a partial spherical seat surface formed in ball seat 78. To provide means for securing ball stud 52 within housing 48, a flange 86 formed on housing 48 is deformed to engage the outer perimeter of socket plug 82. As an alternative, socket plug 82 may be threaded into housing 48.

As previously mentioned, shank segment 46 of tie rod housing 48 is secured within socket 44 of extension rail 30 by a welding process. As such, any typical methods of welding, including friction welding or laser welding, are within the contemplated scope of this invention. Regardless of the method used, a weld joint 88 is created. In accordance with the present invention, rail 30 is preferably stamped to its desired configuration. Therefore, rails 30 formed during the stamping process will require only minimized, if any, finish machining. As opposed to prior art suspension link assemblies which utilize forged extension rods, the suspension link assembly of the present invention disclosed herein utilizes a stamped extension rod to allow for easier manufacturing with reduced costs. One advantage of this suspension link assembly is that there is virtually no variation in the length of the assembly as opposed to that inherently associated with the threaded engagement technique used in the prior art. As such, the present invention is designed such that there is minimum longitudinal tolerance. The prevention of dimension changes within the components of the suspension link assembly provides a more direct and reliable performance response for the vehicular suspension.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A suspension link assembly for interconnecting a suspension member for movement relative to a frame structure of a motor vehicle, said suspension link assembly comprising:

a tie rod assembly including a housing having a non-threaded shank segment and an annular segment defining a cavity, and a ball joint having a ball segment retained in said cavity and a post segment adapted to be secured to the suspension member;

an extension rail having a first end adapted to be pivotably secured to the frame structure and a second end defining an open-ended socket sized to slip fit and retain said shank segment of said housing therein for connecting said tie rod assembly to said extension rail and defining an overall length of said suspension link assembly that may be increased or decreased; and a weld joint between co-joint surfaces on said shank segment of said housing and said rail adjacent to said socket.

2. A suspension link assembly according to claim 1, wherein said extension rail is generally U-shaped and has a pair of laterally-spaced side walls extending from an upper wall, said side walls having convergent flange segments for defining said open-ended socket.

3. A suspension link assembly for use in a vehicular suspension system to interconnect a frame structure and a suspension member, said suspension link assembly comprising:

a ball stud having a ball segment and a post adapted to be fixably coupled to the suspension member;

a housing including an annular segment defining a cavity within which said ball segment of said ball stud is rotatably supported, said housing further including a non-threaded shank segment extending from said annular segment; and a stamped extension rail having an open-ended socket at a first end sized to engage and retain said shank segment of said housing therein such that an overall length of said suspension link assemble may be increased or decreased, and a second end adapter to be pivotably coupled to said frame for transmitting force between the suspension member and the frame while allowing angular movement therebetween, said shank segment of said housing being welded in said socket of said extension rail.

4. The suspension link assembly of said claim 3 further comprising a weld joint between co-joint surfaces of said shank segment and said extension rail adjacent said socket.

5. The suspension link assembly of claim 3 further comprising a locator on said non-threaded shank segment for providing a reference when setting said overall length of said suspension link assembly prior to welding said shank segment to said extension rail.

6. A suspension system for a motor vehicle comprising:

a frame structure;

a suspension member; and a suspension link assembly interconnecting said frame structure and said suspension member, said suspension link assembly including a tie rod assembly including a housing having a non-threaded shank segment and an annular segment defining a cavity, and a ball joint retained in said cavity and secured to said suspension member, said suspension link assembly further including an extension rail having a first end pivotably secured to said frame structure and a second end defining an open-ended socket which is sized to slip fit and retain said shank segment of said housing therein for connecting said tie rod assembly to said extension rail and defining an overall length of said suspension link assembly that may be increased or decreased, and a weld joint between co-joint surfaces of said shank segment and said rail adjacent said socket.

7. A method of assembling a suspension link assembly, said method comprising:

providing a tie rod assembly including a ball joint and a housing having a shank segment and an annular segment defining a cavity in which said ball joint is mounted;

providing an extension rail having an open-ended socket in a first end thereof;

sliding said shank segment of said housing into said socket, said shank adapted for relative axial movement therein such that an overall length of said suspension link assembly may be increased or decreased; and welding said shank segment of said housing to surfaces of said extension rail adjacent to said socket.

8. The method of claim 7 wherein said step of providing said extension rail further comprises providing a stamped extension rail having a generally U-shaped configuration including a pair of laterally spaced side walls extending from an upper wall, said side walls having convergent flange segments for defining said socket.

9. The method of claim 7 further comprising the step of welding an eye-form to a second end of said extension rail.

* * * * *